United States Patent
Nigorikawa et al.

(10) Patent No.: US 8,208,178 B2
(45) Date of Patent: Jun. 26, 2012

(54) IMAGE FORMING APPARATUS, IMAGE FORMING METHOD, AND IMAGE FORMING SYSTEM USING GROUND PATTERN PRINTS

(75) Inventors: Katsuhiro Nigorikawa, Kawasaki (JP); Aiko Okajima, Yokohama (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 974 days.

(21) Appl. No.: 12/198,243

(22) Filed: Aug. 26, 2008

(65) Prior Publication Data
US 2009/0059283 A1 Mar. 5, 2009

Related U.S. Application Data

(60) Provisional application No. 60/968,248, filed on Aug. 27, 2007.

(51) Int. Cl.
*G06K 15/00* (2006.01)
(52) U.S. Cl. ........................ 358/3.28; 713/176
(58) Field of Classification Search ................ 358/3.28; 713/176
See application file for complete search history.

(56) References Cited

U.S. PATENT DOCUMENTS
7,457,957 B2 * 11/2008 Choi et al. ................. 713/176

FOREIGN PATENT DOCUMENTS
| JP | 2006-087075 | 3/2006 |
| JP | 2006-236312 | 9/2006 |
| JP | 2006-345382 | 12/2006 |
| JP | 2007-104062 | 4/2007 |

OTHER PUBLICATIONS

Japanese Office Action for Japanese Patent Application No. 2008-218585 mailed on Aug. 9, 2011.

* cited by examiner

Primary Examiner — Benny Q Tieu
Assistant Examiner — Eric A Rust
(74) Attorney, Agent, or Firm — Turocy & Watson, LLP

(57) ABSTRACT

A digital multifunction peripheral includes a communication unit which inputs document image data, a processing circuit which processes the document image data from the communication unit, a print unit which prints an image corresponding to the document image data processed by the processing circuit, and a memory which holds a ground pattern image file which is generated by converting ground pattern image data into a machine dependent format extractable only by the processing circuit and is registered from outside. The processing circuit extracts the ground pattern image data from the ground pattern image file in a case where document image data of a ground pattern print object is input from the communication unit, and embeds the ground pattern image data into the document image data.

17 Claims, 5 Drawing Sheets

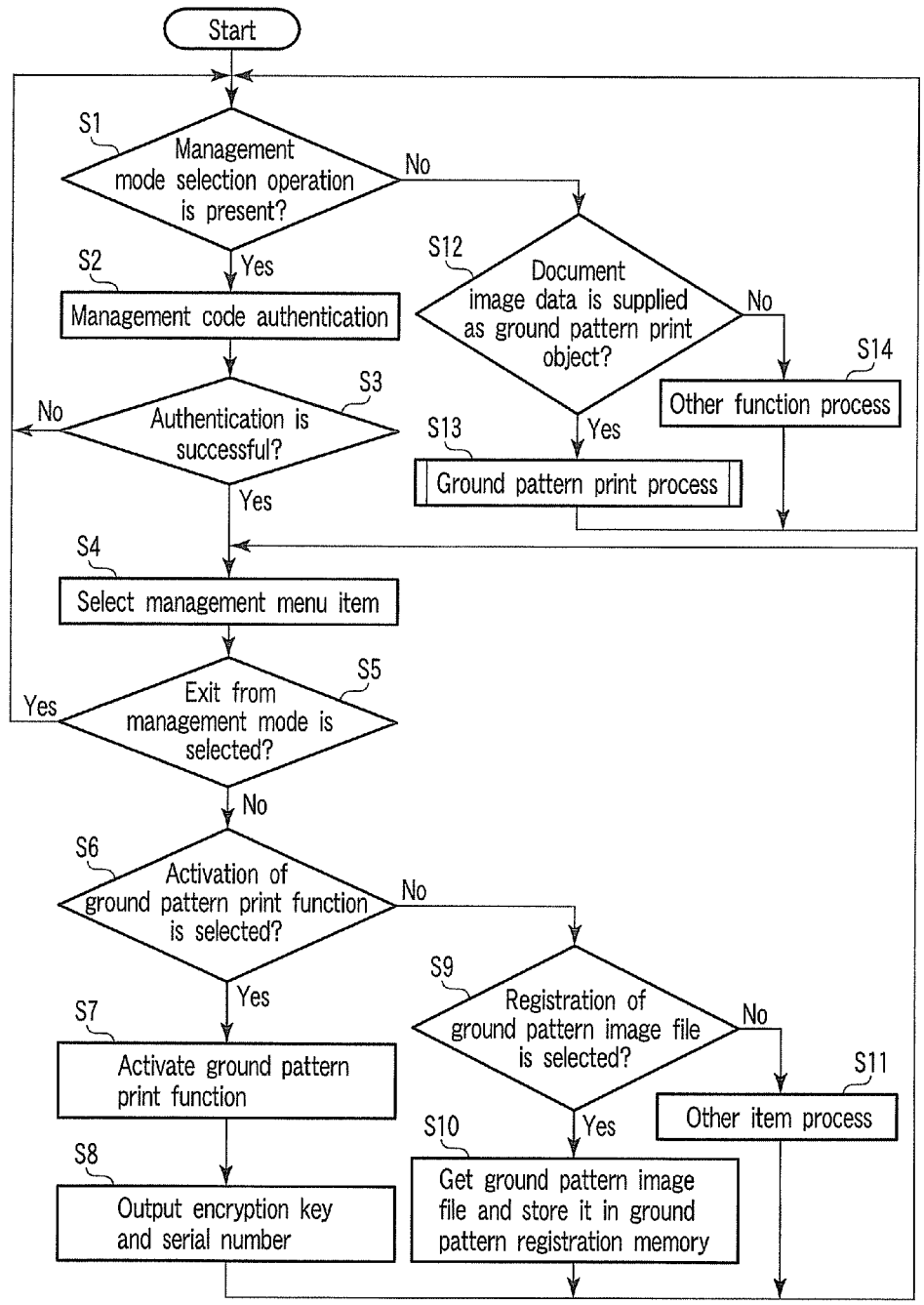
F I G. 3

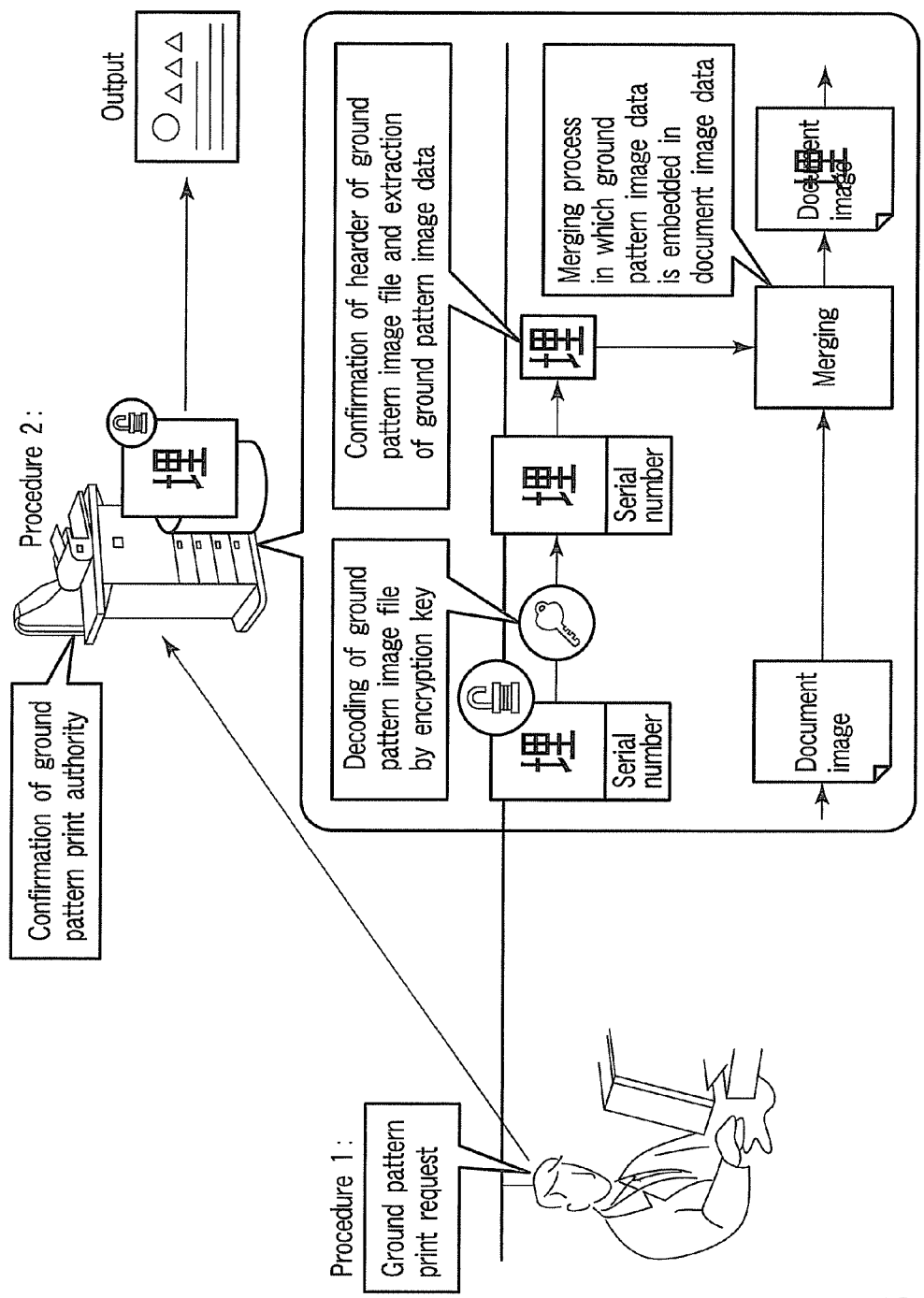
F I G. 6

IMAGE FORMING APPARATUS, IMAGE FORMING METHOD, AND IMAGE FORMING SYSTEM USING GROUND PATTERN PRINTS

CROSS-REFERENCE TO RELATED APPLICATIONS

This application is based upon and claims the benefit of priority from the prior U.S. Patent Application No. 60/968,248 filed Aug. 27, 2007, the entire contents of which are incorporated herein by reference.

BACKGROUND OF THE INVENTION

1. Field of the Invention

The present invention relates to an image forming apparatus, an image forming method and an image forming system, which performs ground pattern printing to issue original prints.

2. Description of the Related Art

A printed material such as a certificate is demanded to be confirmable as an original. Hitherto, ground pattern printing is known as a technique that ensures the originality of a printed material. In the ground pattern printing, a document image is printed along with a ground pattern image corresponding to a ground pattern of characters or graphics that represent "issuer" or "certificate item", for example. Although the ground pattern image is a latent image which can not be recognized even if the original printed material is visually seen, it can be recognized when a microscope, a color filter, or the like is used.

For example, JP-A-2007-104062 discloses an image processing apparatus for performing ground pattern printing. In this document, a ground pattern image includes a latent image part which is an image area where large dots are uniformly arranged at wide intervals, and a background part which is an image area where small dots are uniformly arranged at narrow intervals, and the average density of the latent image part and the average density of the background part are set to be almost equal to each other. By this, characters or graphics of a ground pattern become hard to be macroscopically recognized by the human visual sense, and is concealed in the original printed material. Further, the dot size of the latent image part is set to be larger than the minimum dot size as the limit of the reading and printing resolution of a general copier, and the dot size of the background part is set to be smaller than the minimum dot size. In the case where the original printed material is copied by a general copier, the dots of the latent image part remain in the duplicate similarly to a document image, and the dots of the background part disappear in the duplicate or becomes thinner than the dots of the latent image part. Accordingly, the dots of the latent image part become visible as the characters or graphics of the ground pattern in the duplicate. For example, when the characters of the ground pattern are "COPY", it is easily understood from the revealed characters of the ground pattern that the duplicate is not the original.

Moreover, JP-A-2007-104062 proposes a ground pattern image in which characters of a ground pattern can be confirmed by an image processing using a scanner or the like. In this proposal, the image processing apparatus encodes (encrypts) "issuer" or "certificate item" as the characters or the graphics of the ground pattern by a secret key, generates a binary image pattern of a background part from the encoded information obtained as a result of this, generates a binary image pattern of a latent image part from a public key, and embeds ground pattern image data of a ground pattern image including these binary image patterns into document image data to perform the ground pattern printing. When the latent image part and the background part of the ground pattern image are read from the printed material obtained by this ground pattern printing, the public key is acquired from the binary image pattern of the latent part, the encoded information is acquired from the binary image pattern of the background part, and further, the encoded information is decoded by the public key. In the case where the characters or the graphics of the ground pattern are obtained as a result of the decoding, it becomes clear that this printed material is the original.

However, the image processing apparatus holds, for example, the characters or the graphics of the ground pattern, or an image pattern rule, as embedded electronic information necessary for generation of the ground pattern image data. Accordingly, there is a fear that falsification or analysis of the embedded electronic information is performed in the image processing apparatus, and a printed material such as a certificate is counterfeited or copied as the original.

BRIEF SUMMARY OF THE INVENTION

It is an object of the present invention to provide an image forming apparatus, an image forming method and an image forming system, in which embedded electronic information can be protected.

According to a first aspect of the invention, there is provided an image forming apparatus comprising: an input unit which inputs document image data; a processing unit which processes the document image data from the input unit; a print unit which prints an image corresponding to the document image data processed by the processing unit; and a memory unit which holds a ground pattern image file which is generated by converting ground pattern image data into a machine dependent format extractable only by the processing unit and is registered from outside; wherein the processing unit is configured to extract the ground pattern image data from the ground pattern image file in a case where document image data of a ground pattern print object is input from the input unit, and embeds the ground pattern image data into the document image data.

According to a second aspect of the invention, there is provided an image forming method of an image forming apparatus including an input unit which inputs document image data, a processing unit which processes the document image data from the input unit, and a print unit which prints an image corresponding to the document image data processed by the processing unit, the image forming method comprising: holding a ground pattern image file which is generated by converting ground pattern image data into a machine dependent format extractable only by the processing unit and is registered from outside; extracting the ground pattern image data from the ground pattern image file in a case where document image data of a ground pattern print object is input from the input unit; and embedding the ground pattern image data into the document image data.

According to a third aspect of the invention, there is provided an image forming system comprising:

an image forming apparatus including an input unit which inputs document image data, a processing unit which processes the document image data from the input unit, and a print unit which prints an image corresponding to the document image data processed by the processing unit; a ground pattern generating computer which generates a ground pattern image file by converting ground pattern image data into a machine dependent format extractable only by the processing unit; and a memory unit which holds the ground pattern image file generated by the ground pattern generating computer and registered from outside; wherein the processing unit of the image forming apparatus is configured to extract the ground pattern image data from the ground pattern image file in a case where document image data of a ground pattern print object is input from the input unit, and to embed the ground pattern image data into the document image data.

With the image forming apparatus, the image forming method and the image forming system, since the ground pattern image file generated by converting the ground pattern image data into the machine dependent format extractable only by the processing unit is registered from the outside, the image forming apparatus does not hold embedded electronic information necessary for generation of the ground pattern image data. Accordingly, the embedded electronic information can be protected against leakage from the image forming apparatus. Further, in the ground pattern image file, since the ground pattern image data is converted into the machine dependent format extractable only by the processing unit. Thus, even if the ground pattern image file is taken out to the outside, the ground pattern image data can not be extracted from the ground pattern image file. Moreover, even if a ground pattern image file for another equipment is registered, it is impossible to extract the ground pattern image data from this ground pattern image file and to embed it into the document image data because of the inconsistency of the machine dependent format. That is, as described above, since the management system of the embedded electronic information and the ground pattern image data is strengthened, it is possible to prevent a printed material, such as a certificate, from being counterfeited or copied as the original.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a flowchart showing an operation of the digital multifunction peripheral shown in FIG. 1;

FIG. 6 is a view for explaining a ground pattern print procedure for using the ground pattern print function in the digital multifunction peripheral shown in FIG. 1 from a client computer.

DETAILED DESCRIPTION OF THE INVENTION

Hereinafter, a digital multifunction peripheral of an embodiment of the invention will be described with reference to the accompanying drawings.

Figure 1:
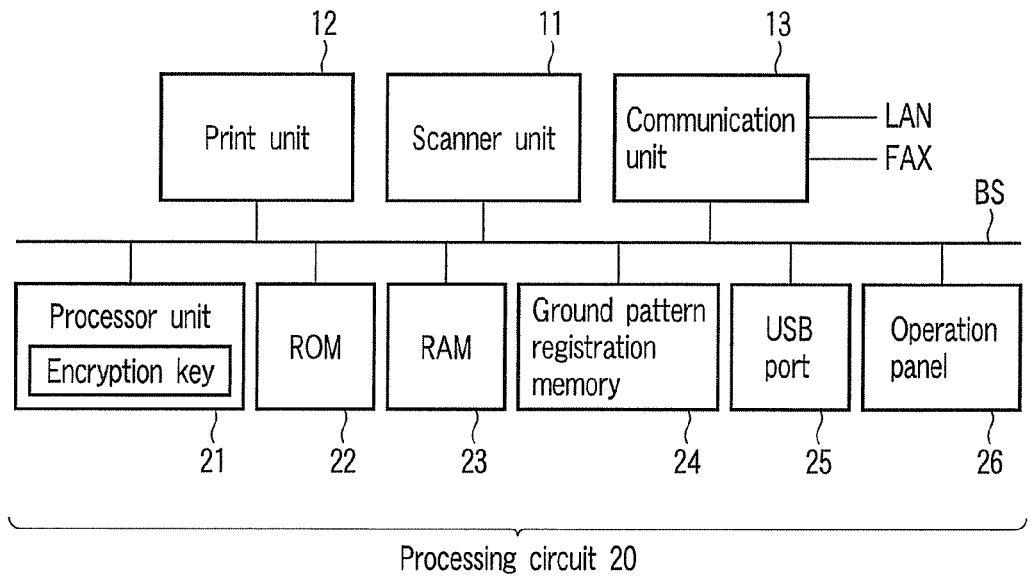
FIG. 1 is a view schematically showing the circuit configuration of a digital multifunction peripheral of an embodiment of the invention.

FIG. 1 schematically shows the circuit configuration of the digital multifunction peripheral. The digital multifunction peripheral includes, for example, a scanner unit 11 which reads an image of a document, a print unit 12 which performs printing on a sheet, a communication unit 13 which performs LAN communication with an external computer and FAX communication with an external FAX apparatus, and a processing circuit 20 which performs a control processing for the units 11 to 13. The scanner unit 11 reads, for example, an image of a document for copying, for FAX transmission or for computer editing, and converts the read image into document image data. The communication unit 13 transmits and receives various data through the LAN communication or the FAX communication. The processing circuit 20 serves as a processing unit which processes document image data input from the input unit such as the scanner unit 11 or the communication unit 13 and outputs the processing result to the print unit 12 or the communication unit 13. The print unit 12 serves as a print unit which prints, in an electrophotographic process, an image corresponding to the document image data processed by the processing circuit 20. In the electrophotographic process, the print unit 12 performs printing by forming an electrostatic latent image corresponding to the image data on an image carrier, develops the electrostatic latent image with toner selectively adhered to the latent image as a toner image, and fixing the toner image to a sheet.

The processing circuit 20 includes a processor unit 21 which executes various processing, a ROM 22 which holds a control program of the processor unit 21, default setting data and the like, a RAM 23 which temporarily stores data input to and output from the processor unit 21, a nonvolatile ground pattern registration memory 24 which holds ground pattern image data and authentication registration data, a USB port 25 which inputs the ground pattern image data and the like, and an operation panel 26 which performs an operation of inputting and displaying various data and request commands. The components 21 to 26 and the units 11 to 13 are interconnected by a control bus BS. The control program causes the processor unit 21 to perform image processing such as conversion of image data from a bitmap format to another file format, conversion of print data from a PDL format to a print image (raster image), resolution conversion, and correction. Further the control program causes the processor unit 21 to perform, upon activation of a ground pattern print function, a merging process of storing a ground pattern image file which is generated by converting ground pattern image data into a machine dependent format extractable only by the processor unit 21 and is registered from outside, extracting ground pattern image data from the ground pattern image file in a case where document image data of a ground pattern print object is input from an input unit such as the scanner unit 11 or the communication unit 13, and embedding the ground pattern image data into the document image data. As an example, the processor unit 21 outputs an encryption key and machine-specific information such as a serial number to the outside through the USB port 25 upon activation of the ground pattern print function. The encryption key is used to encrypt a ground pattern image file which includes a header having the machine-specific information as the machine dependent format and ground pattern image data. The processor unit 21 stores, in the ground pattern registration memory 24, the ground pattern image file registered from the outside through the USB port, decodes the ground pattern image file by the encryption key in a case where document image data of a ground pattern print object is input from an input unit such as the scanner unit 11 or the communication unit 13, extracts the ground pattern image data from the ground pattern image file of the decoding result when it is confirmed that the machine-specific information is coincident with the header content of the ground pattern image file of the decoding result, and embeds the ground pattern image data into the document image data in the RAM 23.

Figure 2:
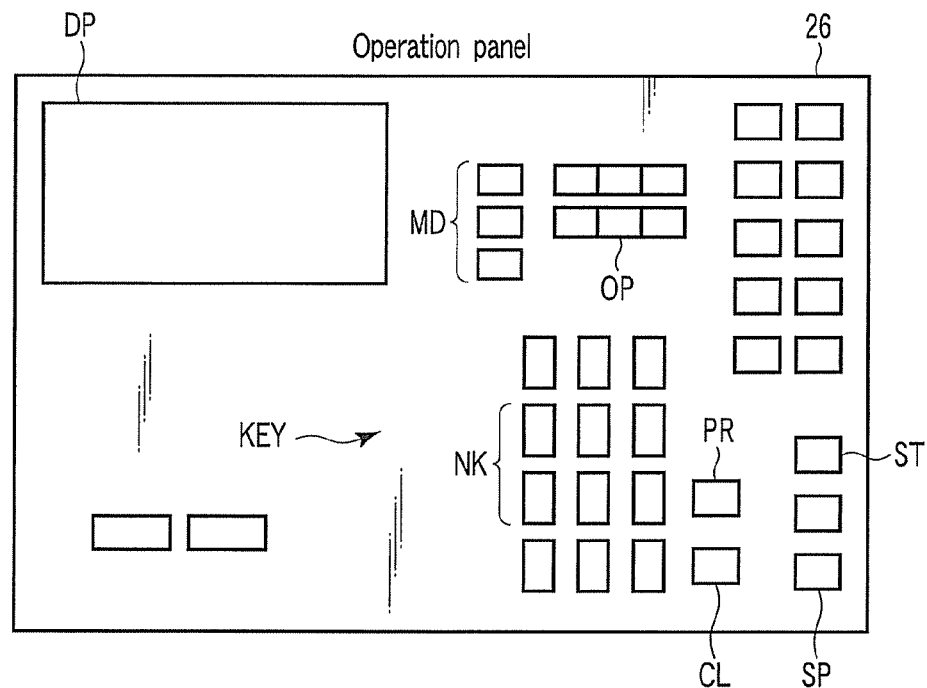
FIG. 2 is a view showing a structural example of an operation panel shown in FIG. 1.

FIG. 2 shows a structural example of the operation panel 24. For example, the operation panel 24 is composed of operation keys KEY including a menu selection key MD, a function option item selection key OP, a numerical value input key NK, a correction key CL, a start key ST, a stop key SP, a ground pattern print key PR, and other keys, and a touch panel type display DP which displays a picture, a message and the like in addition to various input keys usable for a key-in operation.

FIG. 3 shows an operation of the digital multifunction peripheral. When the operation of the digital multifunction peripheral is started, it is checked in step S1 whether a management mode selection operation performed in the operation panel 26 is present. The management mode selection operation is performed, for example, by operating the menu selection key MD to display a menu on the display DP, and touching an item of "management mode" in this menu. When it is confirmed that the management mode selection operation is present, management code authentication is performed in step S2. In the management code authentication, a management code is input by the numerical value input key NK of the operation panel 24. Although this management code is previously notified to a customer engineer dispatched from a technical support center of the digital multifunction peripheral, it is not notified to other general users. Thus, only when the customer engineer inputs the correct management code, the operation of the management mode is approved. When a failure in the management code authentication is detected in step S3, step S1 is again executed so as not to enter the management mode.

On the other hand, when it is detected that the management code authentication is successful, the management mode is actually set, and item selection of the management menu displayed on the display DP is performed in step S4. In step S5, it is checked whether the item "exit from management mode" is selected. When the selected item is "exit from management mode", step S1 is again executed in order to exit from the management mode.

Further, when the selected item is not "exit from management mode", it is checked in step S6 whether the item "activation of ground pattern print function" is selected. When the selected item is "activation of ground pattern print function", the ground pattern print function is activated in step S7. The ground pattern print function is activated by performing authentication registration that gives ground pattern print authority to a user or a LAN connected external client computer. In this authentication registration, an identification code of the user, a network address of the client computer, or the combination thereof is input from a keyboard displayed on the display DP, and is stored as authentication registration data into the ground pattern registration memory 24. When the ground pattern print function is activated, the processor unit 21 generates an encryption key in step S8, correlates the encryption key with the authentication registration data, keeps them safely by itself, and outputs the serial number of the machine-specific information, together with the encryption key, to an external USB memory through the USB port 25. Here, a common key of a common key encryption system is automatically generated as the encryption key. In the case where the USB memory is not mounted in the USB port 25, a request for mounting the USB memory is displayed on the display DP to the customer engineer, and after the mounting of the USB memory is confirmed, the output of the encryption key and the serial number is executed. When the execution of step S8 is completed, the item selection of the management menu is again performed in step S4.

In the case where it is detected in step S6 that the selected item is not "activation of ground pattern print function", it is checked in step S9 whether the item "registration of ground pattern image file" is selected. When the selected item is "registration of ground pattern image file", the ground pattern image file is acquired in step S10 from the USB memory mounted in the USB port 25, is correlated with the authentication registration data and is stored in the ground pattern registration memory 24. In the case where the USB memory is not mounted in the USB port 25, a request for mounting the USB memory is displayed on the display DP to the customer engineer, and after the mounting of the USB memory is confirmed, the acquisition of the ground pattern image file is performed. In addition, the ground pattern image file may be acquired from a computer which is connected to the USB port or the network port of the communication unit 13, instead of the USB memory. When the execution of step S9 is completed, the item selection of the management menu is again performed in step S4. Further, in the case where it is detected in step S9 that the selected item is not "registration of ground pattern image file", another item process is performed in step S11. When the execution of step S9 is completed, the item selection of the management menu is again performed in step S4.

In the case where the selection operation of the management mode is not detected in step S1, it is checked in step S12 whether document image data of the ground pattern print object is supplied from the scanner unit 11 or the communication unit 13. In the case where the scanner unit 11 is used for the input of the document image data of the ground pattern print object, the ground pattern print key PR and the start key ST of the operation panel 26 are successively operated in the state where a document is set on the scanner unit 11. In the case where the communication unit 13 is used for the input of the document image data of the ground pattern print object, the external client computer transmits the ground pattern print request, together with the document image data of the ground pattern print object, to the communication unit 13 through the LAN. When acquisition of the document image data of the ground pattern print object is detected in step S12, the ground pattern print process is performed in step S13 by using the document image data of the ground pattern print object. When the ground pattern print process is completed, step S1 is again executed. Unless the acquisition of the document image data of the ground pattern print object is detected in step S12, the other function process is performed in step S14. When the other function process is completed, step S1 is again executed.

Figure 4:
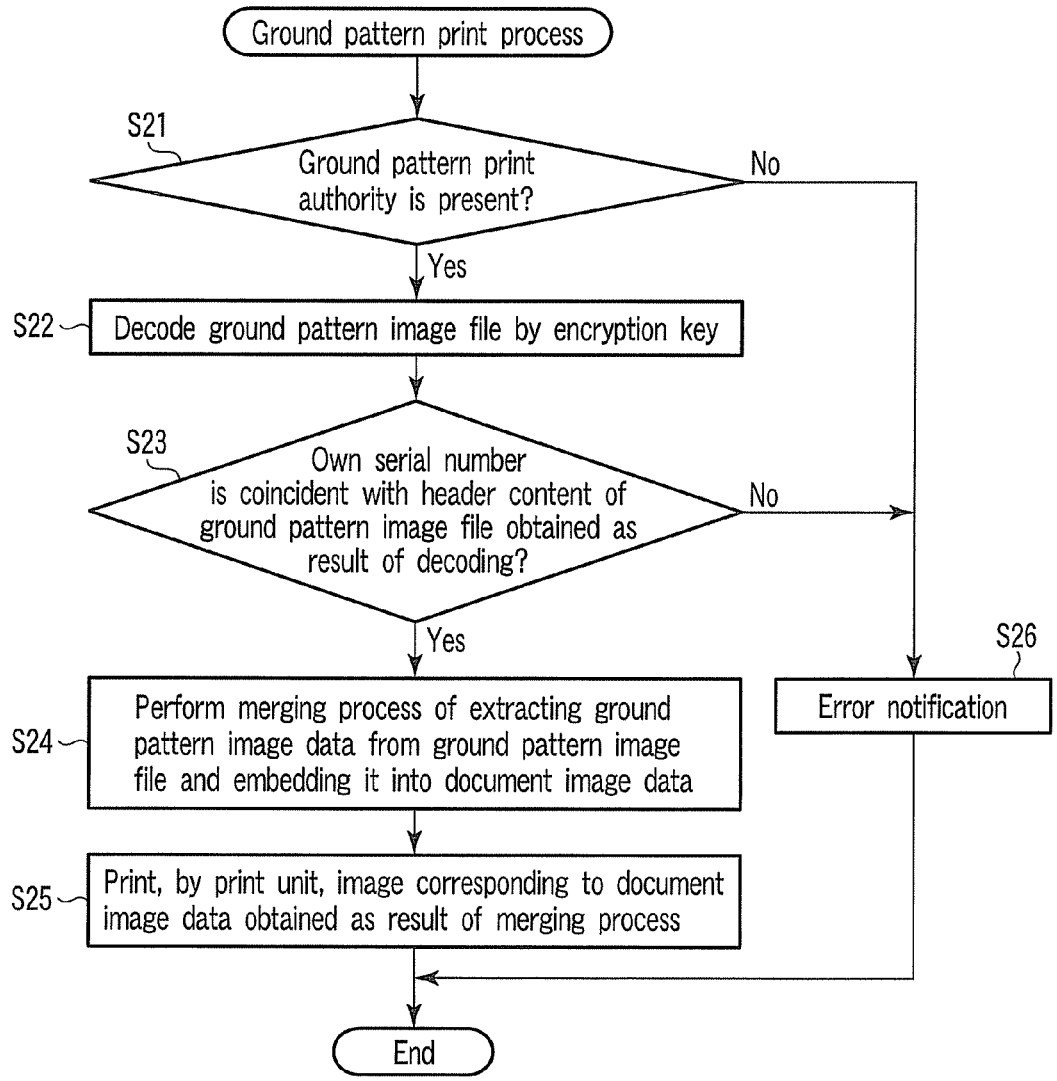
FIG. 4 is a flowchart showing a ground pattern print process shown in FIG. 3 in detail.

FIG. 4 shows the ground pattern print process shown in FIG. 3 in detail. When the ground pattern print process is started, it is checked in step S21 whether the ground pattern print authority is present with respect to the user as the ground pattern print requester or the client computer. Here, at least one of user authentication and client computer authentication is performed based on the identification code of the user stored as the authentication registration data in the ground pattern registration memory 24 and the network address of the client computer. In the case where the user makes a ground pattern print request from the client computer, the identification code and the network address are added to the ground pattern print request and are transmitted, and are compared with the authentication registration data. In the case where a ground pattern print request is made from the ground pattern print key PR, a request for input of the identification code is displayed on the display DP to the user. The identification code input by the user in response to this is compared with the authentication registration data.

When it is detected in step S21 that the ground pattern print authority is present, the processor unit 21 reads the ground pattern image file assigned to the authentication registration data of the ground pattern print requester from the ground pattern registration memory 24, and decodes the ground pattern image file by the encryption key assigned to the authentication registration data of the ground pattern print requester in step S22. In the ground pattern image file of the decoding result, the header and the ground pattern image data are recognizable. At next step S23, it is checked whether the serial number of the machine-specific information is coincident with the header content of the ground pattern image file obtained as the decoding result. When the coincidence is detected, a merging process of extracting the ground pattern image data from the ground pattern image file and embedding it into the document image data of the ground pattern print object is performed in step S24, and the print unit 12 is controlled in step S25 so as to print an image corresponding to the document image data obtained as the result of the merging process. As a result, the original printed material is issued from the print unit 12. Thereafter, the ground pattern print process is ended.

In the case where it is detected in step S21 that the ground pattern print authority is not present, or the inconsistency is detected in step S23, an error notification to the ground pattern print requester is made in step S26, and the ground pattern print process is ended without performing actual ground pattern printing.

Figure 5:
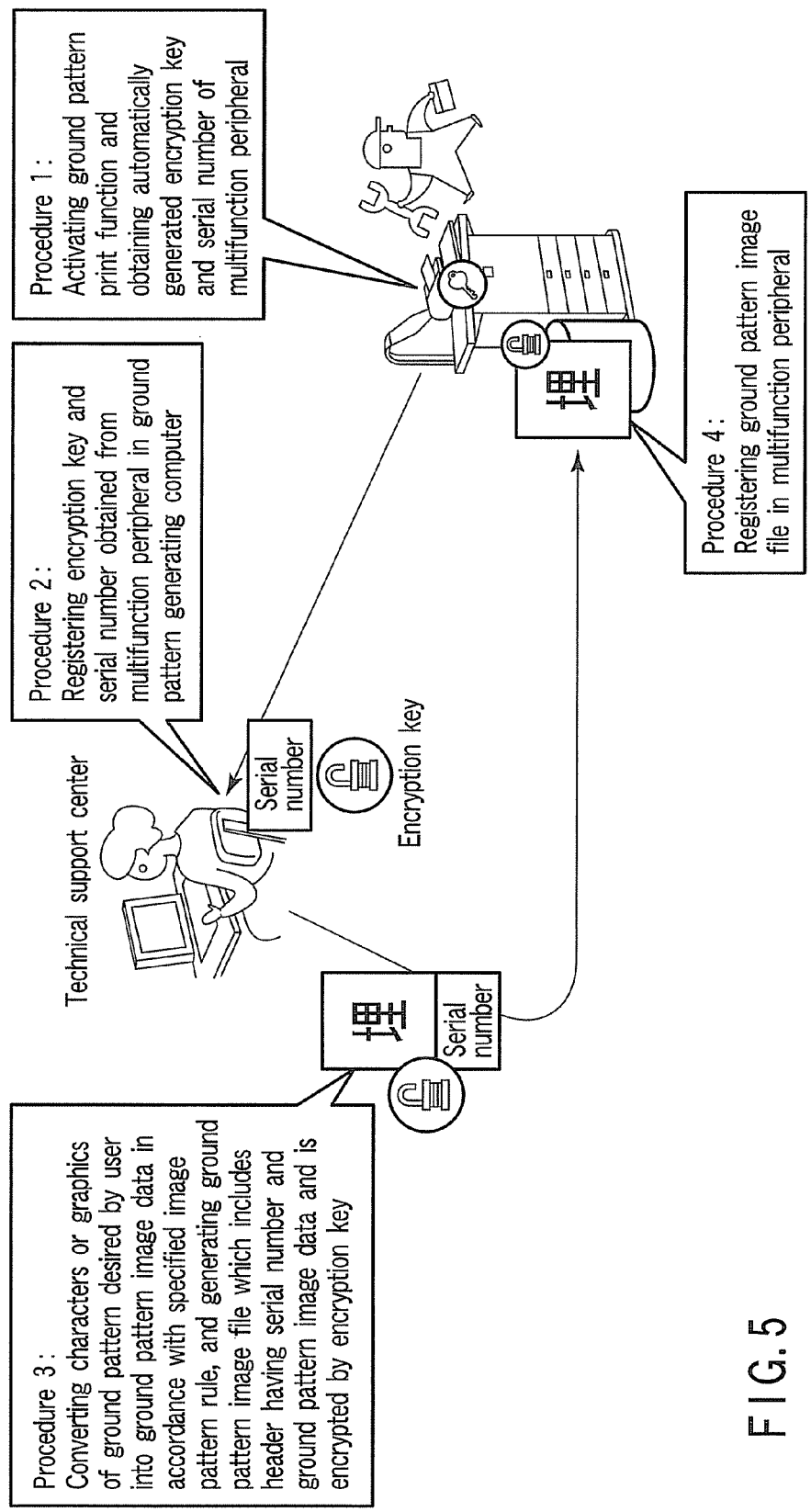
FIG. 5 is a view for explaining a preparation procedure of a ground pattern image file necessary for a ground pattern print function of the digital multifunction peripheral shown in FIG. 1.

Next, a preparation procedure of a ground pattern image file necessary for the ground pattern print function of the digital multifunction peripheral will be described with reference to FIG. 5. In the case where the user orders the option of the ground pattern print function prepared in the digital multifunction peripheral, the customer engineer is dispatched from the technical support center of the digital multifunction peripheral to activate the ground pattern print function of the digital multifunction peripheral.

At procedure 1, the customer engineer operates the operation panel 26 to select the management mode, and to input the management code in the management code authentication necessary for entering the management mode. Thereafter, the customer engineer activates the ground pattern print function by selecting "activation of ground pattern print function" in the management menu displayed when the management code authentication is successful, and performing the authentication registration to give the ground pattern print authority to the user or the client computer. The customer engineer acquires the encryption key and the serial number output from the digital multifunction peripheral when the ground pattern print function is activated and carries them back to the technical support center.

At procedure 2, the customer engineer registers the encryption key and the serial number in a ground pattern generating computer whose security is strictly managed at the technical support center of the digital multifunction peripheral.

At procedure 3, the ground pattern generating computer converts characters or graphics of a ground pattern desired by the user into ground pattern image data in accordance with a specified image pattern rule by dedicated software, and generates a ground pattern image file which includes the ground pattern image data and a header having the serial number and is encrypted by the encryption key. The ground pattern image file can be used only in the digital multifunction peripheral of the output source of the encryption key and the serial number.

At procedure 4, the customer engineer acquires the ground pattern image file generated by the ground pattern generating computer, and registers it in the digital multifunction peripheral of the output source of the encryption key and the serial number. By this, the preparation of the ground pattern image file necessary for the ground pattern print function of the digital multifunction peripheral is completed.

Next, a ground pattern print procedure for the client computer to use the ground pattern print function of the digital multifunction peripheral will be described with reference to FIG. 6.

At procedure 1, the client computer generates document image data of a ground pattern print object, sets the details of an embedding format including the arrangement, size and other features of the ground pattern image data assigned to the document image data, and issues a ground pattern print request for the document image data to the digital multifunction peripheral. The detailed setting of the embedding format is performed using, for example, list information of setting items held in the client computer in advance as part of driver software for the digital multifunction peripheral.

At procedure 2, the digital multifunction peripheral checks the ground pattern print authority of the ground pattern print requester by comparing the identification code of the user of the ground pattern print requester or the network address of the client computer with the authentication registration data, reads the ground pattern image file assigned to the authentication registration data of the ground pattern print requester in the case where it is detected that the ground pattern print authority is present, decodes the ground pattern image file by the encryption key assigned to the authentication registration data of the ground pattern print requester, checks whether the serial number of the digital multifunction peripheral is coincident with the header content of the ground pattern image file obtained as the decoding result, and performs the merging process of extracting the ground pattern image data from the ground pattern image file and embedding it into the document image data of the ground pattern print object in the case the coincidence is detected.

When the ground pattern print procedure is performed as stated above, the image corresponding to the document image data of the merging process result is printed, and is issued as the original printed material.

In this embodiment, since the ground pattern image file generated by converting the ground pattern image data into the machine dependent format extractable only by the processor unit 21 of the digital multifunction peripheral is registered from the outside, the digital multifunction peripheral does not hold embedded electronic information necessary for generation of the ground pattern image data. Accordingly, the embedded electronic information can be protected against leakage from the digital multifunction peripheral. Further, in the ground pattern image file, since the ground pattern image data is converted into the machine dependent format extractable only by the processor unit 21 of the digital multifunction peripheral, even if the ground pattern image file is taken out to the outside, the ground pattern image data can not be extracted from the ground pattern image file. Further, even if a ground pattern image file for another equipment is registered, it is impossible to extract the ground pattern image data from the ground pattern image file and to embed it into the document image data because of the inconsistency of the machine dependent format. That is, since the management system of the embedded electronic information and the ground pattern image data is strengthened as stated above, it is possible to prevent a printed material, such as a certificate, from being counterfeited or copied as the original.

Incidentally, in the embodiment, the common key encryption system is employed in which the digital multifunction peripheral automatically generates the common key as the encryption key, the common key is stored, and the same common key is output to the outside. Instead, a public key encryption system may be employed in which a secret key and a public key are automatically generated as encryption keys, the secret key is stored, and the public key is output to the outside. In the public key encryption system, an external ground pattern generating computer encrypts the ground pattern image file by the public key, and the digital multifunction peripheral decodes the encrypted ground pattern image file by the secret key. In the case where a failure occurs in the decoding because of the difference of the serial number or the header structure, the ground pattern image file is regarded as being a fraud one, and an error is notified instead of the ground pattern printing.

For example, the user may prepare ground pattern image data for ground pattern printing in a specific digital multi-function peripheral. In this case, the ground pattern generating computer of the technical support center has a feature that generates a ground pattern image file by converting the ground pattern image data into the machine dependent format extractable only by the processor unit 21 of the specific digital multifunction peripheral. Besides, the ground pattern generating computer of the technical support center may have a feature that generates a ground pattern image file in which the ground pattern image data is converted into the machine dependent format extractable only by the processor unit 21 of the specific digital multifunction peripheral without using machine-specific information such as the serial number and encrypted by the encryption key, so as to omit the check of the machine-specific information. In addition, the ground pattern generating computer may have a feature that generates a ground pattern image file in which the ground pattern image data is converted into the machine dependent format extractable only by the processor unit 21 of the specific digital multifunction peripheral without using machine-specific information such as the serial number and encrypted by the encryption key and without performing encryption by the encryption key, so as to omit the decoding of the ground pattern image file. With any of the futures, in the case where the ground pattern image data can not be extracted from the ground pattern image file, the ground pattern image file is regarded as being wrong, and an error is notified instead of executing the ground pattern printing.

In the embodiment described above, after the grand pattern image file is decoded by the encryption key, it is checked whether the serial number of the digital multifunction peripheral is coincident with the header content of the ground pattern image file obtained as the decoding result. Instead, only a part corresponding to the header content of the ground pattern image file may be decoded in advance by the encryption key, so that decoding of a part corresponding to the ground pattern image can be made after the decoding result is detected to be coincident with the serial number of the digital multifunction peripheral.

Further, in the embodiment, the processor unit 21 embeds the ground pattern image data into the document image data in accordance with the detailed setting of the embedding format which is made by the client computer in addition to the ground pattern print request. Here, an embedding object range may be the entire one page of the document image data or part thereof. Besides, although the embedding of the ground pattern image data is basically performed in a unit of one pixel, in the RAM 23, any one of a page memory in which all the document image data is rendered, a buffer memory of a desired size in which part of the document image data is rendered, and an independent hardware logic rendering circuit may be used. With respect to the arrangement manner of the ground pattern image data, for example, a manner in which the ground pattern image data is arranged in a desired area of the document image data, or a manner in which the ground pattern image data is arranged in a specific area such as a blank area of the document image data can be used. Further, the arrangement and size of the ground pattern image data may raise a case where the ground pattern image data partially overlaps with a character area (area which is not blank) of the document image data. In this case, writing of the ground pattern image data may be performed after the range of the document image data corresponding to the overlapped portion is made blank.

Further, in the embodiment, the client computer sets the details of the embedding format including the arrangement, size and other features of the ground pattern image data assigned to the document image data at the time of issuing the ground pattern print request. The detailed setting of the embedding format is performed using the list information of setting items held in the client computer in advance as part of driver software for the digital multifunction peripheral. The detailed setting may be performed using, for example, list information of setting items automatically obtained through the LAN from the digital multifunction peripheral. In this case, the ground pattern print authority is classified, and item content which can be set may be restricted in accordance with the kind of the ground pattern print authority. In the case where the document image data of the ground pattern print object is input from the scanner unit 11, the detailed setting of the embedding format may be performed by the operation panel 26.

In the embodiment, although the ground pattern image file is generated by the ground pattern generating computer of the technical support center, the ground pattern generating computer may be installed at another place where a high level of security is established. Besides, in the case where the ground pattern print function is used, it is necessary for the user to notify the desired characters or graphics of the ground pattern to the customer engineer dispatched from the technical support center, however, in the case where the web site of the technical support center is provided on the Internet, the user may access the web site by the client computer to notify the desired characters or graphics of the ground pattern. Further, in the case where the generation of the ground pattern image file is completed, the ground pattern image file can be downloaded from the web site to the client computer as a result of user authentication. In this case, the client computer registers the ground pattern image file in the digital multifunction peripheral through the LAN.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. An image forming apparatus comprising:
an input unit which inputs document image data;
a processing unit which processes the document image data from the input unit;

a print unit which prints an image corresponding to the document image data processed by the processing unit; and a memory unit which holds a ground pattern image file which is generated by converting ground pattern image data into a machine dependent format extractable only by the processing unit and is registered from outside, wherein the processing unit is configured to extract the ground pattern image data from the ground pattern image file in a case where document image data of a ground pattern print object is input from the input unit, and embeds the ground pattern image data into the document image data, and wherein the processing unit is configured to output machine-specific information to be incorporated in the ground pattern image file to the outside for obtaining the machine dependent format, upon activation of the ground pattern print function, and to confirm the machine-specific information incorporated in the ground pattern image file before extraction of the ground pattern image data from the ground pattern image file is performed in the case where the document image data of the ground pattern print object is input from the input unit.

2. The image forming apparatus according to claim 1, wherein the processing unit is configured to omit the extraction of the ground pattern image data in a case where the machine-specific information is wrong.

3. The image forming apparatus according to claim 1, wherein the processing unit is configured to output, together with the machine-specific information, an encryption key for encrypting the ground pattern image file, and to decode the ground pattern image file before the extraction of the ground pattern image data from the ground pattern image file.

4. The image forming apparatus according to claim 3, wherein the processing unit is configured to omit the extraction of the ground pattern image data in a case where a failure occurs in decoding of the ground pattern image file.

5. The image forming apparatus according to claim 1, wherein the processing unit is configured to confirm ground pattern print authority with respect to a ground pattern print request made for the document image data of the ground pattern print object before the extraction of the ground pattern image data from the ground pattern image file, and to omit the extraction of the ground pattern image data in a case where a failure occurs in authentication of the ground pattern print authority.

6. The image forming apparatus according to claim 5, wherein the processing unit is configured to embed the ground pattern image data into the document image data in accordance with setting of an embedding format which is performed by an external computer with the ground pattern print request.

7. The image forming apparatus according to claim 1, wherein the machine-specific information is a serial number.

8. An image forming method of an image forming apparatus including an input unit which inputs document image data, a processing unit which processes the document image data from the input unit, and a print unit which prints an image corresponding to the document image data processed by the processing unit, the image forming method comprising:

holding a ground pattern image file which is generated by converting ground pattern image data into a machine dependent format extractable only by the processing unit and is registered from outside;

extracting the ground pattern image data from the ground pattern image file in a case where document image data of a ground pattern print object is input from the input unit; and embedding the ground pattern image data into the document image data, wherein machine-specific information to be incorporated in the ground pattern image file is output to the outside by the processing unit for obtaining the machine dependent format, upon activation of the ground pattern print function, and the machine-specific information incorporated in the ground pattern image file is confirmed before extraction of the ground pattern image data from the ground pattern image file is performed in the case where the document image data of the ground pattern print object is input from the input unit.

9. The image forming method according to claim 8, wherein the extraction of the ground pattern image data is omitted in a case where the machine-specific information is wrong.

10. The image forming method according to claim 8, wherein an encryption key to encrypt the ground pattern image file is output together with the machine-specific information, and the ground pattern image file is decoded before the extraction of the ground pattern image data from the ground pattern image file.

11. The image forming method according to claim 10, wherein the extraction of the ground pattern image data is omitted in a case where a failure occurs in decoding of the ground pattern image file.

12. The image forming method according to claim 8, wherein ground pattern print authority is confirmed with respect to a ground pattern print request made for the document image data of the ground pattern print object before extraction of the ground pattern image data from the ground pattern image file, and the extraction of the ground pattern image data is omitted in a case where a failure occurs in authentication of the ground pattern print authority.

13. The image forming method according to claim 12, wherein the ground pattern image data is embedded into the document image data in accordance with setting of an embedding format which is performed by an external computer with the ground pattern print request.

14. The image forming method according to claim 8, wherein the machine-specific information is a serial number.

15. An image forming system comprising: an image forming apparatus including an input unit which inputs document image data, a processing unit which processes the document image data from the input unit, and a print unit which prints an image corresponding to the document image data processed by the processing unit;

a ground pattern generating computer which generates a ground pattern image file by converting ground pattern image data into a machine dependent format extractable only by the processing unit; and a memory unit which holds the ground pattern image file generated by the ground pattern generating computer and registered from outside;

wherein the processing unit of the image forming apparatus is configured to extract the ground pattern image data from the ground pattern image file in a case where document image data of a ground pattern print object is input from the input unit, and to embed the ground pattern image data into the document image data, and wherein the processing unit is configured to output machine-specific information to be incorporated in the ground pattern image file to the outside for obtaining the machine dependent format, upon activation of the ground pattern print function, and to confirm the machine-specific information incorporated in the ground pattern image file before extraction of the ground pattern image data from the ground pattern image file is performed in the case where the document image data of the ground pattern print object is input from the input unit.

16. The image forming system according to claim 15, wherein the processing unit is configured to output, together with the machine-specific information, an encryption key to encrypt the ground pattern image file, and to decode the ground pattern image file before the extraction of the ground pattern image data from the ground pattern image file.

17. The image forming system according to claim 16, wherein the processing unit is configured to omit the extraction of the ground pattern image data in a case where a failure occurs in decoding of the ground pattern image file and in a case where the machine-specific information is wrong.

* * * * *